(12) United States Patent (10) Patent No.: US 8,161,822 B2
Volanthen (45) Date of Patent: Apr. 24, 2012

(54) PLACEMENT OF STRAIN SENSORS IN WIND TURBINE BLADE

(75) Inventor: Mark Volanthen, Romsey (GB)

(73) Assignee: Insensys Limited, Hampshire (GB)

( * ) Notice: Subject to any disclaimer, the term of this patent is extended or adjusted under 35 U.S.C. 154(b) by 50 days.

(21) Appl. No.: 12/741,046

(22) PCT Filed: Oct. 3, 2008

(86) PCT No.: PCT/GB2008/050892
§ 371 (c)(1), (2), (4) Date: Sep. 3, 2010

(87) PCT Pub. No.: WO2009/056869
PCT Pub. Date: May 7, 2009

(65) Prior Publication Data
US 2010/0329864 A1 Dec. 30, 2010

(30) Foreign Application Priority Data
Nov. 2, 2007 (GB) .................................. 0721618.7

(51) Int. Cl.
*G01L 1/00* (2006.01)
*F01D 5/18* (2006.01)
(52) U.S. Cl. ................. 73/760; 73/767; 416/1
(58) Field of Classification Search .................... None
See application file for complete search history.

(56) References Cited

U.S. PATENT DOCUMENTS

| 6,769,873 B2 * | 8/2004 | Beauchamp et al. | 416/3 |
| 2010/0004878 A1 * | 1/2010 | Volanthen et al. | 702/42 |
| 2010/0232961 A1 * | 9/2010 | Volanthen et al. | 416/61 |
| 2010/0232963 A1 * | 9/2010 | Volanthen et al. | 416/146 R |
| 2010/0307257 A1 * | 12/2010 | Volanthen et al. | 73/800 |
| 2011/0214508 A1 * | 9/2011 | Volanthen | 73/800 |

FOREIGN PATENT DOCUMENTS

| EP | 1359321 | | 11/2003 |
| EP | 1 635 034 A1 | | 3/2006 |
| EP | 1 780 523 A1 | | 5/2007 |
| JP | 2002/107122 | | 4/2002 |
| WO | 2005/071382 | | 8/2005 |

OTHER PUBLICATIONS

International Search Report for corresponding application No. PCT/GB2008/050892 dated Jan. 14, 2009.
United Kingdom Search Report from corresponding Application No. GB 0721618.7 dated Feb. 10, 2008.

* cited by examiner

*Primary Examiner* — Andre Allen
(74) *Attorney, Agent, or Firm* — Renner, Otto, Boisselle & Sklar, LLP

(57) ABSTRACT

A method of monitoring strain on a wind turbine blade that has several structural components comprises locating at least three strain sensors (2a, 2b, 2c) on one of the structural components of the turbine blade, the positions of the strain sensors defining a plane transverse to the longitudinal direction of the turbine blade and resolving strain signals from the three strain sensors into strain measurements in two orthogonal directions.

5 Claims, 3 Drawing Sheets ns in two orthogonal directions. The strain signals may be bending strains or bending loads in two orthogonal directions.

Thus, according to the present invention, the three strain sensors are located on only one of the structural members of the turbine blade. In this way, the sensors can be installed in the one component during manufacture even before the various components are assembled into a wind turbine. This significantly simplifies the integration of strain sensors into the manufacturing process for wind turbines. Thus, the strain sensors may be located on the structural components before the structural component is assembled into the turbine blade.

The structural components of the wind turbine blade may include at least two outer shell members, which together form the outer surface of the turbine blade. The method may include locating the strain sensors on one of the outer shell members. For example, the strain sensors may be located on the internal surface of the outer shell member.

The structural components of the wind turbine blade may include at least one structural beam to which at least one shell member which forms the outer surface of the turbine blade is connected in the assembled wind turbine blade. The method may include locating the strain sensors on the structural beam. The strain sensors may be located, for example, on an inside or an outside surface of the structural beam. The structural beam may be, for example, a box beam.

The wind turbine blade may comprise structural components that are each shorter than the complete length of the assembled wind turbine blade but which together are assembled into the complete blade.

The method may comprise locating a connector for the output of the three strain sensors on the same structural component of the turbine blade as the three strain sensors.

PLACEMENT OF STRAIN SENSORS IN WIND TURBINE BLADE

This application is a national phase of International Application No. PCT/GB2008/050892 filed Oct. 3, 2008 and published in the English language.

FIELD OF THE INVENTION

This invention relates to a method of monitoring strain on a wind turbine blade.

BACKGROUND TO THE INVENTION

Blades for wind turbines are typically constructed of glass-reinforced plastics (GRP) on a sub-structure, which may be formed of wood, glass fibre, carbon fibre, foam or other materials. Graphite fibre in epoxy resin is also used. The plastics resin can be injected into a mould containing the sub-structure to form the outer surface of the blade. The blade may also be built up as a series of layers of fibre material and resin. In some cases, the fibre material is pre-impregnated with resin.

A typical wind turbine blade may have a length of between 20 and 60 metres or more. As the interior of the blade is generally hollow, a "floor" is provided within the blade proximate the hub-engaging end of the blade. The blade floor is a bulkhead about 0.5 metres to 2.5 metres into the blade that prevents service personnel falling into a blade while working in the hub.

It is known, for example from U.S. Pat. No. 4,297,076, to provides the blades of a wind turbine with strain gauges and to adjust the pitch of portions of the blades in response to the bending moment on the blades measured by the strain gauges. Optical fibre strain sensors are known and WO 2004/056017 discloses a method of interrogating multiple fibre Bragg grating strain sensors along a single fibre. In the system of WO 2004/056017, Bragg gratings are defined in the optical fibre at spaced locations along the optical fibre. When the optical fibre is put under strain, the relative spacing of the planes of each Bragg grating changes and thus the resonant optical wavelength of the grating changes. By determining the resonant wavelength of each grating, a strain measurement can be derived for the location of each grating along the fibre. Optical strain sensors operating on the principle of back scattering which do not require discrete gratings along the fibre are also known.

Optical fibres are delicate components that require very accurate alignment to function correctly. It is therefore desirable to minimise the potential opportunities for damage to the optical fibres during installation in a turbine blade and any subsequent steps of the blade manufacturing process. The present invention, at least in its preferred embodiments, seeks to address this issue.

SUMMARY OF THE INVENTION

According to the present invention, there is provided a method of monitoring strain on a wind turbine blade, the blade having a plurality of structural components. The method comprises locating at least three strain sensors on one of the structural components of the turbine blade, the positions of the strain sensors defining a plane transverse to the longitudinal direction of the turbine blade and resolving strain signals from the three strain sensors into strain mea-

BRIEF DESCRIPTION OF THE DRAWINGS

Embodiments of the invention will now be described by way of example only and with reference to the accompanying drawings, in which.

DETAILED DESCRIPTION OF EMBODIMENTS

Figure 1:
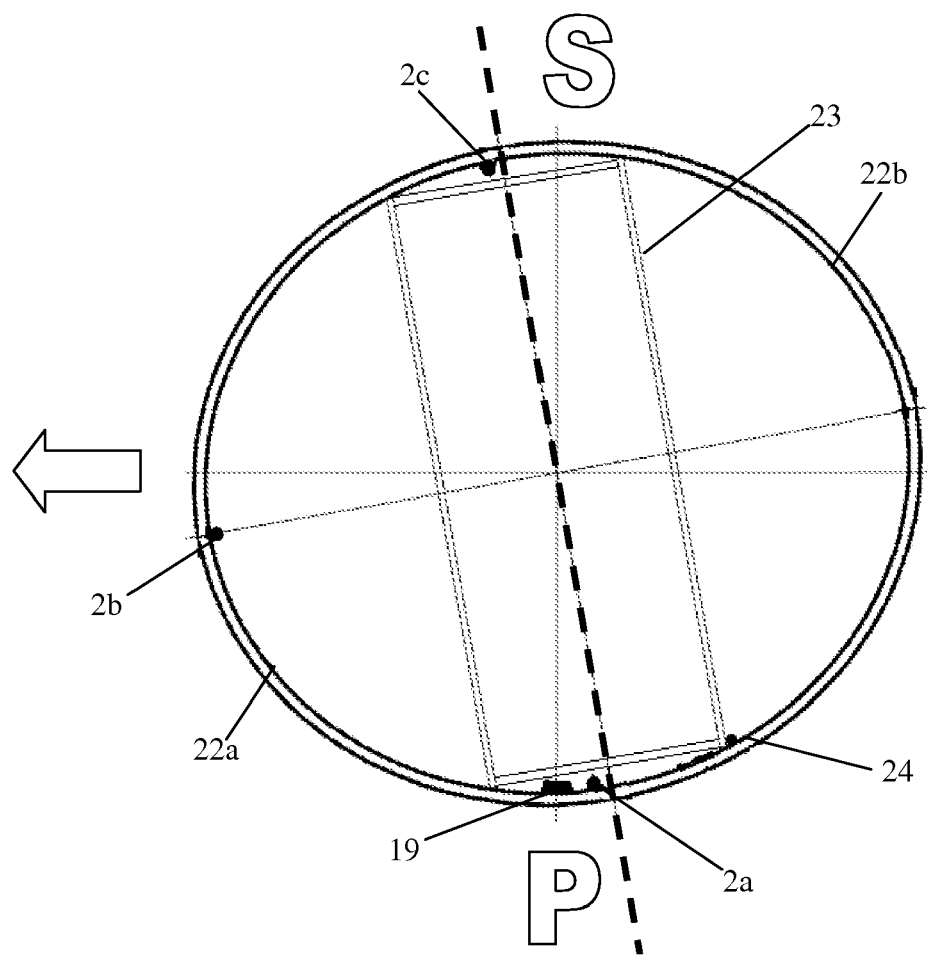
FIG. 1 shows the positioning of strain sensors within a wind turbine blade according to a first embodiment of the invention.

FIG. 1 shows the positioning of strain sensors 2a, 2b, 2c in a typical wind turbine blade 21. The view in FIG. 1 is a cross section of the base of the turbine blade 21 viewed from the hub of the wind turbine towards the tip of the turbine blade 21. The direction of travel of the turbine blade is indicated by the large arrow and the suction side of the blade aerofoil is indicated by the large letter S and the pressure side of the blade aerofoil is indicated by the large letter P. The turbine blade 21 is constructed as a surface shell formed in two halves 22a, 22b that are mounted about a structural box beam 23. The dividing line between the two halves 22a, 22b of the surface shell is indicated by the heavy dashed line in FIG. 1. The sensors are mounted to the internal surface of one half of the shell 22a at the centre of the shell half 22a and at the edges of the shell half 22a. In this way, the sensors 2a, 2b, 2c are mounted to single structural component of the turbine blade 21, so that it is not necessary for the connections between individual sensors to cross between components of the turbine blade.

The sensors 2a, 2b, 2c take the form of fibre Bragg gratings formed in an optical fibre that forms the connection between the gratings. The optical fibre is connected, in use, to an instrument that supplies optical pulses to the optical fibre and evaluates the reflected light from the gratings as described in WO 2004/056017, for example.

As shown in FIG. 1, the first sensor 2a is located on the pressure side of the turbine blade 21. The third sensor 2c is located on the suction side of the turbine blade 21. Thus, the differential strain measurements from this pair of sensors can be used to determine bending moments on the turbine blade 21 due to forces normal to the plane of rotation of the turbine blade.

The second sensor 2b is located on the leading edge of the turbine blade 21. Thus, the differential strain measurements from the second sensor 2b and the sum of the strain measurements from the first and the third sensors 2a, 2c can be used to determine bending moments on the turbine blade 21 due to forces in the plane of rotation of the turbine blade.

A connector box 19 is mounted to the inner surface of the turbine blade 21 at a suitable location in the same shell half 22a as the sensors 2a, 2b, 2c and provides the connection between the optical fibre that contains the sensors 2a, 2b, 2c and the external sensing instrument. The turbine blade 21 includes a lightning conductor 24 and it will be seen that the sensors are arranged such that there is no connection that crosses the lightning conductor 24.

Figure 2:
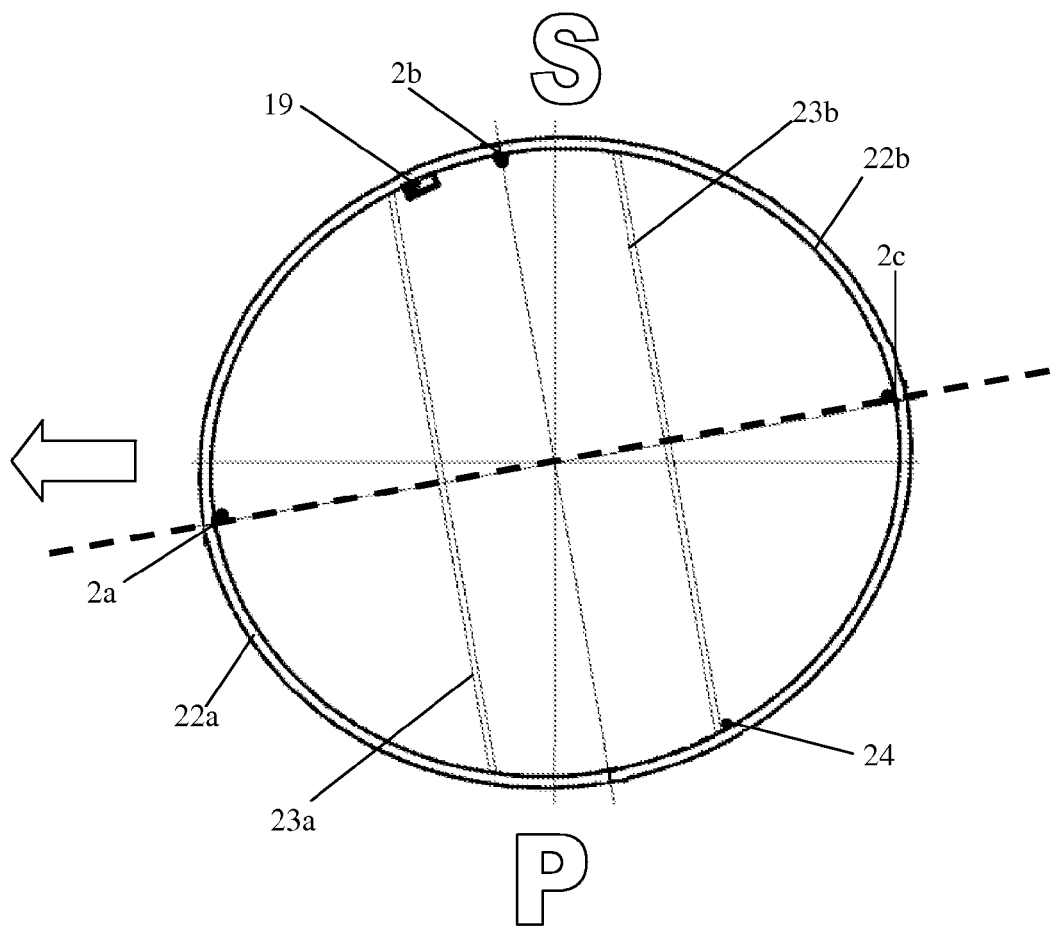
FIG. 2 shows the positioning of strain sensors within a wind turbine blade according to a second embodiment of the invention.

FIG. 2 shows a second embodiment of the invention in which the blade shell halves 22a, 22b are connected by shear webs 23a, 23b, rather than the central beam 23 of FIG. 1. In this case, the blade shell halves 22a, 22b are at right angles to the orientation in FIG. 1. In the embodiment of FIG. 2, the first sensor 2a is located on the leading edge of the turbine blade 21. The third sensor 2c is located on the trailing edge of the turbine blade 21. Thus, the differential strain measurements from this pair of sensors can be used to determine bending moments on the turbine blade 21 due to forces in the plane of rotation of the turbine blade 21.

In this embodiment, the second sensor 2b is located on the suction side of the turbine blade 21. Thus, the differential strain measurements from the second sensor 2b and the sum of the strain measurements from the first and the third sensors 2a, 2c can be used to determine bending moments on the turbine blade 21 due to forces normal to the plane of rotation of the turbine blade.

Figure 3:
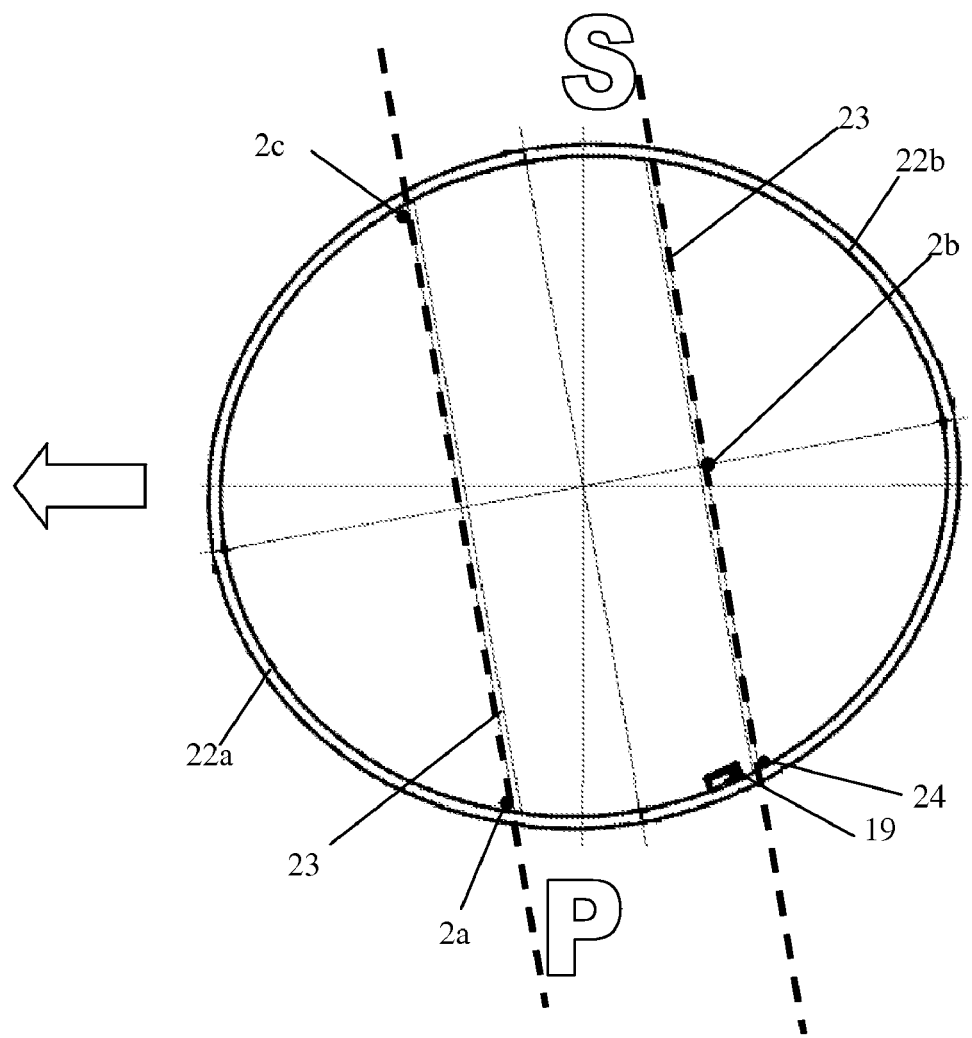
FIG. 3 shows the positioning of strain sensors within a wind turbine blade according to a third embodiment of the invention.

FIG. 3 shows a third embodiment of the invention in which the sensors 2a, 2b, 2c are mounted to the central beam 23 of the turbine blade 21, which itself forms a portion of the outer surface of the turbine blade 21. The interface between the central beam 23 and the two parts of the blade shell 22a, 22b is indicated by dashed lines in FIG. 3. In the embodiment of FIG. 3, the first sensor 2a is located towards the pressure side of the turbine blade 21. The third sensor 2c is located towards the suction side of the turbine blade 21. Thus, the differential strain measurements from this pair of sensors can be used to determine bending moments on the turbine blade 21 due to forces normal to the plane of rotation of the turbine blade 21.

In this embodiment, the second sensor 2b is located towards the trailing edge of the turbine blade 21. Thus, the differential strain measurements from the second sensor 2b and the sum of the strain measurements from the first and the third sensors 2a, 2c can be used to determine bending moments on the turbine blade 21 due to forces in the plane of rotation of the turbine blade.

In summary, a method of monitoring strain on a wind turbine blade that has several structural components comprises locating at least three strain sensors 2a, 2b, 2c on one of the structural components of the turbine blade, the positions of the strain sensors defining a plane transverse to the longitudinal direction of the turbine blade and resolving strain signals from the three strain sensors into strain measurements in two orthogonal directions.

The invention claimed is:

1. A method of monitoring strain on a wind turbine blade, the blade having a plurality of structural components, the method comprising:
   locating at least three strain sensors on one of the structural components of the turbine blade, the positions of the strain sensors defining a plane transverse to a longitudinal direction of the turbine blade; and
   resolving strain signals from the three strain sensors into strain measurements in two orthogonal directions.

2. A method as claimed in claim 1, wherein the strain sensors are located on the structural component before the structural component is assembled into the turbine blade.

3. A method as claimed in claim 1, wherein the structural components of the wind turbine blade include at least two outer shell members, which together form the outer surface of the turbine blade, and the method includes locating the strain sensors on one of the outer shell members.

4. A method as claimed in claim 1, wherein the structural components of the wind turbine blade include at least one structural beam to which at least one shell member which forms the outer surface of the turbine blade is connected in the assembled wind turbine blade, and the method includes locating the strain sensors on the structural beam.

5. A method as claimed in claim 1, wherein the method comprises locating a connector for the output of the three strain sensors on the same structural component of the turbine blade as the three strain sensors.

* * * * *